United States Patent
Rekimoto

(10) Patent No.: US 9,069,867 B2
(45) Date of Patent: Jun. 30, 2015

(54) RESOURCE MANAGEMENT SYSTEM, METHOD AND PROGRAM FOR SELECTING CANDIDATE TAG

(75) Inventor: Junichi Rekimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1405 days.

(21) Appl. No.: 11/692,558

(22) Filed: Mar. 28, 2007

(65) Prior Publication Data

US 2007/0233715 A1 Oct. 4, 2007

(30) Foreign Application Priority Data

Mar. 30, 2006 (JP) ................ P2006-095051

(51) Int. Cl.
*G06F 17/30* (2006.01)

(52) U.S. Cl.
CPC .... *G06F 17/30873* (2013.01); *G06F 17/30997* (2013.01); *G06F 17/30616* (2013.01); *G06F 17/30864* (2013.01); *G06F 17/30722* (2013.01); *Y10S 707/99934* (2013.01); *G06F 17/3071* (2013.01); *G06F 17/3089* (2013.01); *G06F 17/30705* (2013.01); *G06F 17/30884* (2013.01)

(58) Field of Classification Search
CPC .............. G06F 17/30873; G06F 17/30864; G06F 17/3089; G06F 17/30616; G06F 17/30705; G06F 17/3071; G06F 17/30722; G06F 17/30997; Y10S 707/99934
USPC ........................................................ 715/234
See application file for complete search history.

(56) References Cited

U.S. PATENT DOCUMENTS

| | | | |
|---|---|---|---|
| 6,078,913 A * | 6/2000 | Aoki et al. ............................. 1/1 |
| 6,826,724 B1 * | 11/2004 | Shimada et al. .............. 715/234 |
| 2003/0182295 A1 * | 9/2003 | Ukai et al. ..................... 707/100 |
| 2004/0139066 A1 * | 7/2004 | Yokohari et al. .................. 707/3 |
| 2004/0268236 A1 * | 12/2004 | Chidlovskii et al. ........... 715/513 |
| 2005/0160360 A1 * | 7/2005 | Nadamoto et al. ............. 715/513 |
| 2006/0018506 A1 * | 1/2006 | Rodriguez et al. ............. 382/100 |
| 2006/0253458 A1 * | 11/2006 | Dixon et al. .................... 707/10 |
| 2006/0271533 A1 * | 11/2006 | Sakurai et al. ..................... 707/5 |

(Continued)

FOREIGN PATENT DOCUMENTS

| | | |
|---|---|---|
| JP | 2003-058535 | 2/2003 |
| JP | 2005-352782 | 12/2005 |
| WO | 2005/091175 A1 | 9/2005 |

OTHER PUBLICATIONS

Liang, Chun-Yan et al., Dictionary-based text categorization of chemical web pages, Oct. 19, 2005, Elsevier, pp. 1017-1029.*

(Continued)

*Primary Examiner* — Nathan Hillery
(74) *Attorney, Agent, or Firm* — K&L Gates LLP

(57) ABSTRACT

Resource management system, method and program for selecting candidate tag are provided. The tag can be readily attached to a resource by presenting a candidate tag also to a resource newly registered in a database. The degree of similarity of a new registration resource to each of a plurality of already-registered resources that have been already registered in the database is calculated. A tag attached to an already-registered resource of which the degree of similarity is large is selected as a candidate for a tag to be attached to the new registration resource. Thereby, a candidate tag can be also presented to a resource newly registered in the database. A user can further readily attach a tag compared to a conventional system.

6 Claims, 5 Drawing Sheets

(56) References Cited

U.S. PATENT DOCUMENTS

| | | | |
|---|---|---|---|
| 2007/0150487 A1* | 6/2007 | Christian et al. | 707/100 |
| 2007/0179968 A1* | 8/2007 | Fish | 707/102 |
| 2007/0185858 A1* | 8/2007 | Lu et al. | 707/5 |
| 2007/0185901 A1* | 8/2007 | Gates | 707/102 |
| 2008/0091797 A1* | 4/2008 | Busey | 709/217 |
| 2008/0097822 A1* | 4/2008 | Schigel et al. | 705/10 |
| 2008/0104032 A1* | 5/2008 | Sarkar | 707/3 |
| 2008/0235005 A1* | 9/2008 | Golan et al. | 704/9 |

OTHER PUBLICATIONS

Kwon, Oh-Woog et al., Web Page Classification Based on k-Nearest Neightbor Approach, 2000, ACM, pp. 9-15.*

J.J. Aucouturier et al., "Music Similarity Measures: What's the Use?" ISMIR, 2002, pp. 157-163.

Paulus et al., "Measuring the Similarity of Rhythmic Patterns," ISMIR, 2002, pp. 150-156.

Dixon et al., "Classification of Dance Music by Periodicity Patterns," ISMIR, 2003, pp. 156-165.

About Flickr (website) printed from http://www.flickr.com/about/ on Apr. 13, 2007.

What is del.icio.us? (website) printed from http://del.icio.us/about/ on Apr. 13, 2007.

Yokoyama, et al., "Feature Amount Based on Correspondence of Fractal Coded Images and Similarity Retrieval," the technical report by the Institute of Image Information and Television Engineers, 2002, vol. 26, No. 54, pp. 29-32.

Japanese Office Action issued Mar. 24, 2011, corresponding to Japanese Appln. No. 2006-095051.

Japanese Office Action issued Dec. 13, 2011, corresponding to Japanese Appln. No. 2006-095051.

* cited by examiner

RESOURCE MANAGEMENT SYSTEM, METHOD AND PROGRAM FOR SELECTING CANDIDATE TAG

CROSS REFERENCE TO RELATED APPLICATION

The present application claims priority to Japanese Patent Application JP 2006-095051 filed in the Japanese Patent Office on Mar. 30, 2006, the entire contents of which is being incorporated herein by reference.

BACKGROUND

The present invention relates to a resource management system, a method for selecting a candidate tag, and a candidate tag selecting program, and is applicable to the case of managing many resources by using a tag.

Hereinafter, on the Internet, a system in which many users attach a tag to a common resource (a picture and a web bookmark) for arrangement has been generally used.

For example, in the Flickr that is a picture sharing service for sharing a picture on the network (see http://www.flickr.com), an arbitrary tag such as "TOKYO", "FOOD" or "PARTY" is attached to (associated with) a picture uploaded on a database, so that only a resource having a specified tag can be retrieved and extracted. Further, because resources are unnecessary to be classified in a specified hierarchical structure, a plurality of different images can be attached to one resource as tags, so that resources can be arranged further flexibly.

This tag attachment may be individually performed. However, in the case where many users share the same resource, it works further effectively. For example, in the del.icio.us that is a social bookmark service for sharing an web bookmark on the network (see http://del.icio.us), a user can attach an arbitrary tag such as "PROGRAMMING", "GUIDE", "SERVICE" or "SHOPPING" to a bookmarked web page for arrangement.

Further, this del.icio.us has a candidate tag present function in that if the same web page has been already bookmarked by other user, a tag attached by the above other user is presented as a candidate tag. Thereby, if a desired tag has been already attached by other user, it is unnecessary to enter the character string, and the user can readily perform tag attachment by selecting the presented candidate tag with a mouse or the like.

However, in the aforementioned candidate tag present function, when in newly performing a bookmark registration of an web page that has not been bookmarked by other user, because existent tag information cannot be used, the user have to enter a tag explicitly. Therefore, there has been a tendency that as to a famous web page of which the degree of sharing is high such that many tags have been already attached, plentiful tags will be attached and it can be readily retrieved, however, as to an web page newly bookmarked, because a tag attachment operation is complicated, tag attachment is not performed so actively.

As the above, in a conventional social bookmark service, there has been a problem that a tag attachment operation to a new bookmark is complicated.

SUMMARY

In view of the foregoing, it is desirable to provide a resource management system, a method for selecting a candidate tag, and a candidate tag selecting program in that a tag can be readily attached to a resource newly registered.

The present application can be applied to various resource management systems.

According to an embodiment, there is provided degree-of-similarity calculating means for calculating the degree of similarity of a new registration resource newly registered in a database, to each of a plurality of already-registered resources that have been already registered in the database, and candidate tag selecting means for selecting a tag attached to an already-registered resource of which the degree of similarity calculated by the degree-of-similarity calculating means is large, as a candidate for a tag to be attached to the new registration resource.

By selecting a tag attached to a resource of which the degree of similarity is high as a candidate tag, a candidate tag can be also presented to a resource newly registered in a database. Thereby, a user can further readily attach a tag compared to a conventional system.

The nature, principle and utility of the present invention will become more apparent from the following detailed description when read in conjunction with the accompanying drawings in which like parts are designated by like reference numerals or characters.

Additional features and advantages are described herein, and will be apparent from, the following Detailed Description and the figures.

DETAILED DESCRIPTION

Preferred embodiments will be described with reference to the accompanying drawings.

(1) Overall Configuration of Social Bookmark System

Figure 1:
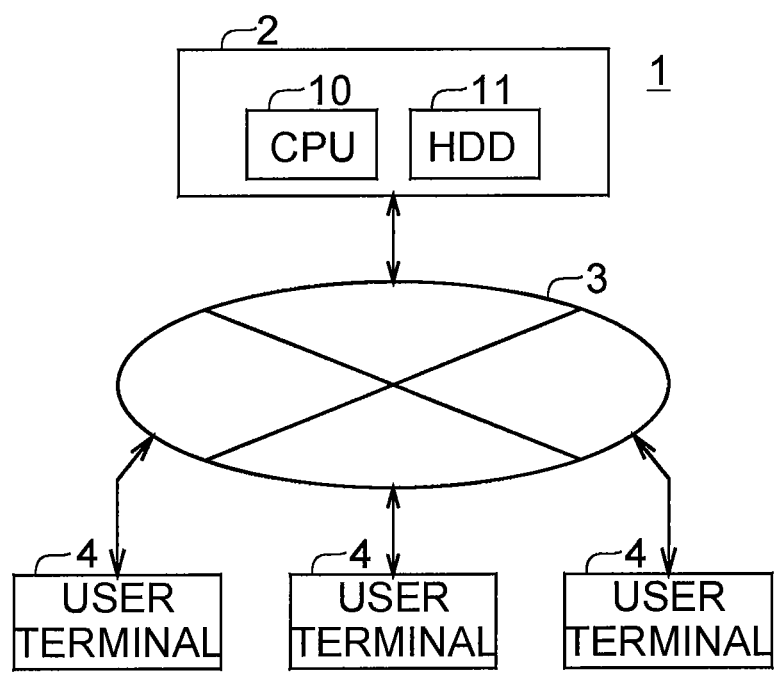
FIG. 1 is a block diagram showing an overall configuration of a bookmark sharing system.

Referring to FIG. 1, the reference numeral 1 designates a bookmark sharing system as a whole. The bookmark sharing system 1 is formed by that a plurality of user terminals 4 are connected to a bookmark server 2 via the Internet 3.

Each user terminal 4 is an information processing unit having an Internet connection function such as a personal computer, a personal digital assistant (PDA) and a cellular phone. Each of them accesses an web server on the Internet 3 (not shown) according to a user operation, obtains web page data, and displays an web page based on the above obtained web page data to make a user view it.

In addition to this, in the bookmark sharing system 1, by that the user of the user terminal 4 registers a user account on the bookmark server 2, a bookmark list peculiar to the above user account can be formed in the bookmark server 2. The registration user of the bookmark sharing system 1 (hereinafter, it is also simply referred to as "user") can register the bookmark of an arbitrary web page in the user's own bookmark list (hereinafter, it is also simply referred to as "bookmark an web page").

Additionally, in the bookmark sharing system 1, when in registering a bookmark in the bookmark list, the user can attach an arbitrary tag to the above bookmark. Further, the user also can retrieve a bookmark registered by other user, by using an arbitrary tag as a keyword.

Figure 2:
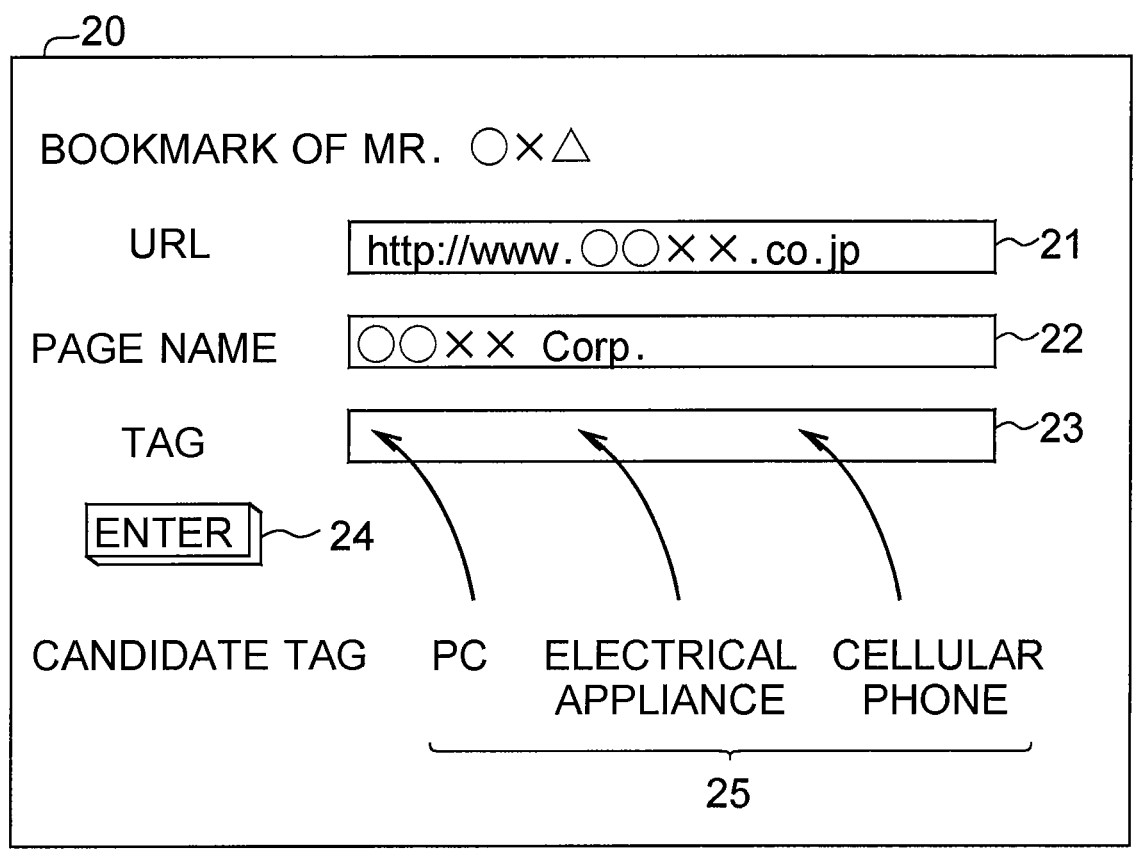
FIG. 2 is a schematic diagram showing the configuration of a bookmark registration screen.

That is, in the bookmark server 2, the lists of their respective bookmarks of each user have been stored in a bookmark database in a hard disk drive 11 (FIG. 2). If receiving a bookmark registration request from the user terminal 4, the Central Processing Unit (CPU) 10 of the bookmark server 2 enters this in the bookmark list of the registration user by associating an web page with a tag that are specified in the above bookmark registration request.

Further, if receiving a bookmark retrieval request from the user terminal 4, the CPU 10 of the bookmark server 2 performs retrieval from the bookmark database, by using the tag specified by the above registration request as a keyword, extracts a bookmark to which the same tag as the specified tag has been attached as the retrieval result, and returns this to the user terminal 4.

In this manner, in the bookmark sharing system 1, users can register their own bookmark lists in the bookmark server 2 respectively. At the same time, many bookmarks registered by each user can be shared among all of the registration users, and a desired bookmark can be retrieved using a tag from among the above many bookmarks.

(2) Automatic Presentation of Candidate Tag (2-1) Configuration of Bookmark Registration Screen In addition to the above configuration, at the time when a user newly registers an arbitrary web page in a bookmark list, if this new registration page has been already registered by other user, the bookmark server 2 presents a tag attached to the already-registered page by the other user or the like as a candidate tag.

That is, if accepting a predetermined bookmark registration operation by the user via input means such as a keyboard, the user terminal 4 transmits the Uniform Resource Locator (URL) of the new registration page that was specified by the user as an object of a bookmark in this operation to the bookmark server 2, with a bookmark registration temporary request.

If receiving the bookmark registration temporary request transmitted from the user terminal 4, by responding this, the CPU 10 of the bookmark server 2 returns display data for displaying a bookmark registration screen 20 shown in FIG. 2 to the user terminal 4. Thereby, the bookmark registration screen 20 is displayed in the above user terminal 4.

As shown in FIG. 2, in the bookmark registration screen 20, a URL display field 21 to display the URL of the new registration page specified as the bookmark object in the bookmark registration temporary request (hereinafter, it is referred to as "new registration URL"), a page name display field 22 to display the name of the new registration page, a tag display field 23 to display a tag to be attached to the new registration page, and a bookmark registration button 24 to register the new registration page in the user's bookmark list are displayed.

In the URL display field 21, the page name display field 22 and the tag display field 23, an arbitrary character can be entered by the user via input means such as a keyboard provided in the user terminal 4. For example, in the page name display field 22, a page name attached to the new registration page is automatically displayed. However, the above page name can be freely changed by the user. Similarly, the URL displayed in the URL display field 21 can also be freely changed by the user. Thereby, a lower-order page, a higher-order page or the like in the web page can be arbitrary specified and set as a new registration URL. Further, in the tag display field 23, one or a plurality of character strings to be attached to a bookmark can be arbitrary entered by the user as a tag.

Further, at a part lower than the tag display field 23 in the bookmark registration screen 20, one or a plurality of candidate tags 25 recommended by the bookmark server 2 for the new registration URL specified in the bookmark registration temporary request are displayed. This candidate tag 25 is that the bookmark server 2 selected a tag related to the new registration URL by candidate tag selecting processing that will be described later. Then, the user can select an arbitrary one of the displayed candidate tags 25 to make it display in the tag display field 23.

That is, if accepting a candidate tag 25 selecting operation by the user via the input means such as a keyboard, by responding to this, the user terminal 4 copies the character string of the selected candidate tag 25, and displays it in the tag display field 23. In this manner, in the bookmark sharing system 1, the bookmark server 2 presents candidate tags 25 related to a new registration URL. Thereby, the user can readily perform tag attachment.

Then, if accepting a pressing operation of the bookmark registration button 24 by the user via the input means, by responding to this, the user terminal 4 transmits the new registration URL and the page name, and an attached tag to the bookmark server 2 with a bookmark registration request.

If receiving the bookmark registration request transmitted from the user terminal 4, by responding to this, the CPU 10 of the bookmark server 2 associates the page name and the tag with the new registration URL received at the same time, and registers this in this user's bookmark list as an already-registered URL.

Further, at this time, the CPU 10 of the bookmark server 2 accesses an web page specified by the new registration URL, obtains a document described in the above web page as already-registered text data, and registers this in the bookmark list in association with the already-registered URL.

(2-2) Candidate Tag Selecting Processing

Next, the aforementioned candidate tag selecting processing for a new registration URL by the bookmark server 2 will be described in detail.

If receiving a bookmark registration temporary request from the user terminal 4, the CPU 10 of the bookmark server 2 retrieves the same URL as the new registration URL that was received with the above bookmark registration temporary request from the bookmark lists of all of users on the bookmark database.

If the same URL as the new registration URL has been registered in some bookmark lists as an already-registered URL, the CPU 10 obtains a tag attached to the above already-registered URL from the bookmark database, and transmits this to the user terminal 4 as a candidate tag with display data for displaying the bookmark registration screen 20.

On the contrary, if the same URL as the new registration URL has not been registered in any bookmark lists (that is, if this URL will be registered in the bookmark database for the first time), the CPU 10 cannot select a candidate tag in this state. Therefore, the CPU 10 of the bookmark server 2 accesses a new registration page specified by the above new registration URL, and obtains a character string described in the above new registration page as new registration text data.

Then, the CPU 10 compares the obtained new registration text data with all of already-registered text data stored in the bookmark database and calculates the degree of similarity respectively (the calculating method will be described later), selects a predetermined number of (for example, ten) already-registered text data of which the degree of similarity to the above new registration text data is high, and transmits a tag attached to the already-registered URL corresponding to the above selected already-registered text data of which the degree of similarity is high to the user terminal 4 as a candidate tag, with display data for displaying the bookmark registration screen 20. Then, the user terminal 4 displays the candidate tag received from the bookmark server 2 in the bookmark registration screen 20 to present this to the user.

In this manner, the CPU 10 of the bookmark server 2 retrieves an already-registered page having the contents similar to a new registration page, and selects a tag attached to this as a candidate tag. Thereby, a candidate tag can be also presented to a bookmark registered in the bookmark database for the first time.

(2-3) Calculation of Degree of Similarity and Selection of Candidate Tag

Next, the aforementioned method for calculating the degree of similarity between new registration text data and already-registered text data, and a method for selecting a candidate tag will be described.

As a method for calculating the degree of similarity between text data, a method for obtaining the number of co-occurrence of words, a method using Latent Semantics Analysis (LSA), and the like have been generally used. These various methods for calculating the degree of similarity can be used in the present invention.

Further, as a method for selecting a candidate tag, if the degree of similarity between new registration text data and already-registered text data Sim(Newpage,Webi) was calculated as being within −1 to 1, a tag attached to the already-registered page is added by the following formula:

$$W(Tagj)=\Sigma\{Sim(NewPage,Webi)*(\Sigma\ hasTag(Webi,Tagj))\} \quad (1)$$

Here, the W(Tag) is an weighting factor to determine whether or not Tag should be set as a candidate. Further, if the tag Tagj has been attached to a certain web page Webi, the tag factor hasTag(Webi,Tagj) becomes 1, and if the tag Tagj has not been attached, it becomes 0.

In this manner, the weighting factor W(Tag) can be calculated about the respective tags attached to all of the already-registered pages. Thereby, an adequate number of (for example, ten) tags of which the above weighting factor W(Tag) is large are selected, and are transmitted to the user terminal 4 as candidate tags.

(2-4) Candidate Tag Selecting Processing Procedure

Figure 3:
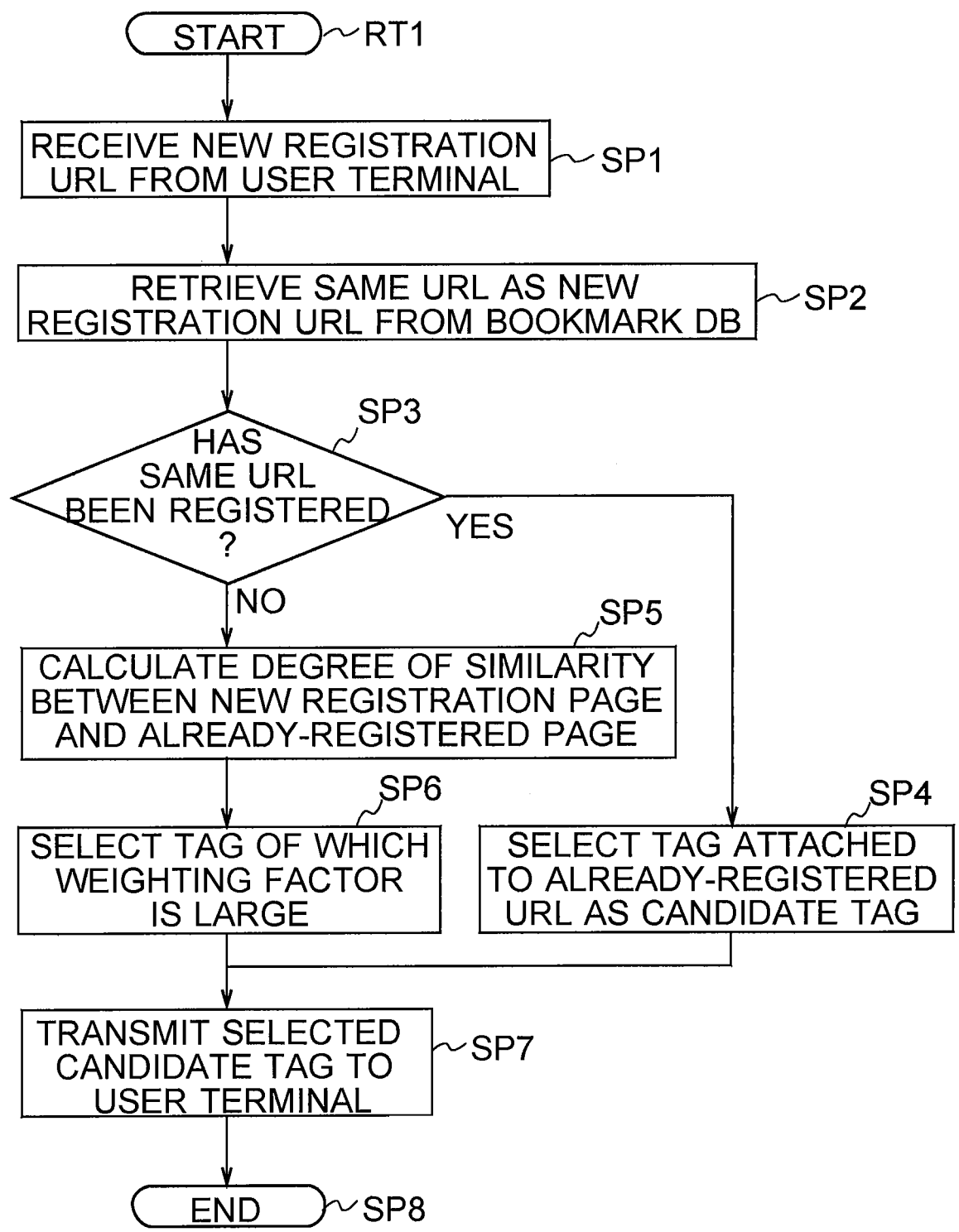
FIG. 3 is a flowchart of a candidate tag selecting processing procedure.

Next, the procedure of the aforementioned processing that the bookmark server 2 selects a candidate tag for a new registration page and transmits this to the user terminal 4 will be described in detail, with reference to a flowchart shown in FIG. 3.

The CPU 10 of the bookmark server 2 enters a candidate tag selecting processing procedure RT1 from the start step, and proceeds to step SP1. If receiving a new registration URL from the user terminal 4 with a bookmark registration temporary request, the CPU 10 proceeds to the next step SP2.

In step SP2, the CPU 10 retrieves the same URL as the above new registration URL from already-registered URL in the bookmark database, by using the received new registration URL as a retrieval keyword, and proceeds to the next step SP3.

In step SP3, the CPU 10 determines whether the same already-registered URL as the new registration URL has been registered in the bookmark database, based on the retrieval result.

If an affirmative result is obtained in step SP3, this means that an web page that is going to be performed bookmark registration has already been registered in the bookmark database by other user. At this time, the CPU 10 proceeds to step SP4 to select a tag attached to the same already-registered URL as the new registration URL as a candidate tag, and proceeds to step SP7.

On the contrary, if a negative result is obtained in this step SP3, this means that the above web page will be registered in the bookmark database for the first time. At this time, the CPU 10 proceeds to step SP5.

In step SP5, the CPU 10 serving as degree-of-similarity calculating means accesses a new registration page specified by the new registration URL, obtains a character string described in the above page as new registration text data, and compares the above new registration text data with all of the already-registered text data stored in the bookmark database and calculates the degree of similarity respectively. Then, the CPU 10 proceeds to the next step SP6.

In step SP6, the CPU 10 serving as candidate tag selection means calculates the respective weighting factors W(Tag) of tags attached to each already-registered page based on the calculated degree of similarity, and selects a tag of which the above weighting factor W(Tag) is large as a candidate tag. Then, the CPU 10 proceeds to the next step SP7.

And then, in step SP7, the CPU 10 transmits the selected candidate tag to the user terminal 4, and proceeds to the next step SP8 to finish the candidate tag selecting processing procedure.

(3) Operation and Effect

According to the above configuration, if a new registration page accepted from the user terminal 4 has been already bookmarked by other user, the bookmark server 2 in the bookmark sharing system 1 selects a tag that has been attached to this page by that other user as a candidate tag, and transmits this to the user terminal 4. Thereby, a tag attachment operation to the above new registration page can be readily performed.

Further, even if the new registration page accepted from the user terminal 4 has not been bookmarked by other user, the bookmark server 2 selects a tag that has been attached to a page having the similar contents to the new registration page, in all of the web pages that have been performed bookmark registration in the bookmark database as a candidate tag, and transmits this to the user terminal 4. Thereby, a tag attachment operation can be also readily performed to an web page that will be completely newly performed bookmark registration in the bookmark database.

(4) Other Embodiments

In the aforementioned embodiment, it has dealt with the case where a tag factor is calculated based on the presence of tag attachment, by setting a tag factor hasTag(Webi,Tagj)=1 when a tag Tagj has been attached to a certain web page Webi, and by setting a tag factor hasTag(Webi,Tagj)=0 when a tag Tagj has not been attached. However, the present invention is not only limited to this but also the tag factor may be calculated by considering the number of users who attached a tag. For example, it can be considered that when n pieces of tag Tagj have been attached to a certain web page Webi, a tag factor HasTag(Webi,Tagj)=n is set.

Figure 4:
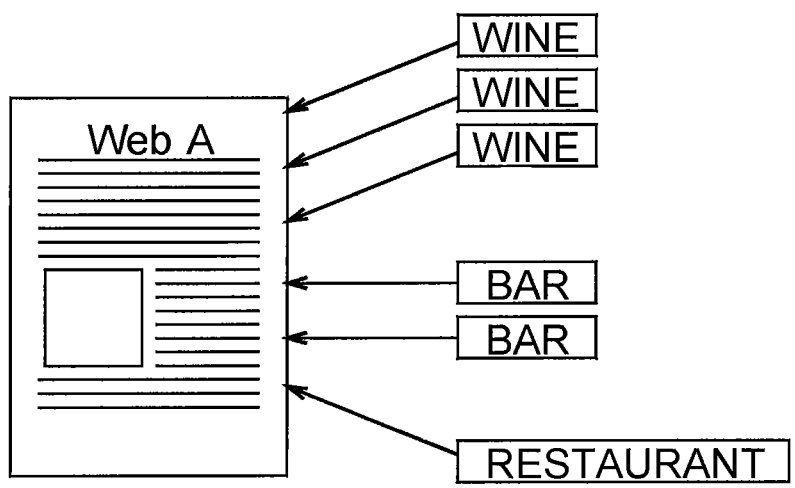
FIG. 4 is a schematic diagram for explaining the calculation of a tag factor corresponding to the attached number of tags.

That is, in a social tagging system as the bookmark sharing system 1 of an embodiment of the present invention, there is often a case where a plurality of users attach the same tag to a certain web page. For example, in FIG. 4, to a certain web page WebA, a tag "WINE" has been attached by three users, a tag "BAR" has been attached by two users, and a tag "RESTAURANT" has been attached by one user. A tag factor in this case is hasTag(WebA,WINE)=3, hasTag(WebA,BAR) =2, and hasTag(WebA,RESTAURANT)=1.

In this manner, if calculating a weighting factor W(Tag) using a tag factor in consideration of the attached number of tags, a candidate tag which reflects tag attachment state and is highly accurate can be selected.

Further, in the aforementioned embodiment, it has dealt with the case where the present invention is applied to tag attachment to an web page in the bookmark sharing system 1. However, the present invention is not only limited to this but also it can be widely applied to the case of attaching a tag to various resources of which the degree of similarity can be calculated.

As such resources to which the present invention is applicable, audio data and image data, and the like can be considered. Then, as a method for calculating the degree of similarity for audio data, a similarity of power spectrum in musical compositions (J.-J. Aucouturier and F. Pachet: Music similarity measures: What's the use? Proc. ISMIR 2002, pp. 157•63 (2002)), a similarity of rhythm (J. Paulus and A. Klapuri: Measuring the similarity of rhythmic patterns. Proc. ISMIR 2002, pp. 150-156 (2002)), the feature amount of a modulation spectrum (Dixon, E. Pampalk and G. Widmer: Classification of dance music by periodicity patterns. Proc. ISMIR 2003, pp. 159•65 (2003), or the like can be used. On the other hand, as a method for calculating the degree of similarity for image data, a method based on fractal images (Takanori Yokoyama, Toshinori Watanabe and Ken Sugawara: "Feature Amount Based on Correspondence of Fractal Coded Images and Similarity Retrieval", the technical report by the Institute of Image Information and Television Engineers, Vol. 26, No. 54, pp. 29-32, 2002), or the like can be used.

Further, in the aforementioned embodiment, it has dealt with the case where the present invention is applied to a system in that a plurality of users attach a tag to a resource to manage information as a social tagging system. However, the present invention is not only limited to this but also can be applied to an individual information management system in that one user manages information.

Figure 5:
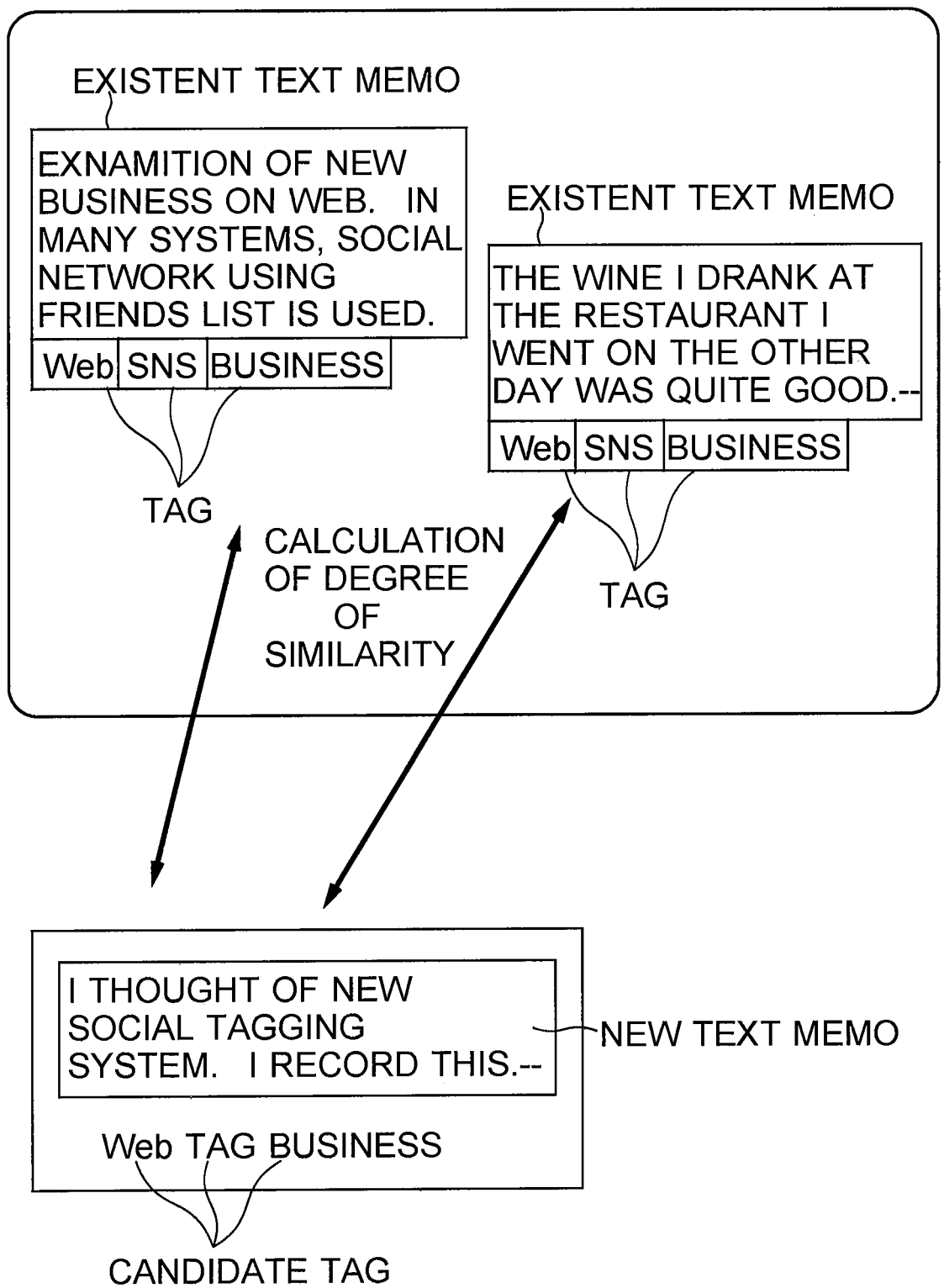
FIG. 5 is a schematic diagram for explaining a text management system to which an embodiment of the present invention is applied.

As an example of such individual information management system, a text management system in that a tag is attached to a text memo and is managed on a computer can be considered, for example. That is, as shown in FIG. 5, in the text management system, an arbitrary tag is attached to a text memo entered by a user, and the text memo can be retrieved using the above tag. Then, if a new text memo is entered by the user, the CPU of a computer executing the text management system calculates the degree of similarity between the above new text memo and existent text memos already entered, and presents a tag that has been attached to a text memo of which the degree of similarity is high as a candidate tag for the new text memo. Thereby, in this text management system, the user can perform tag attachment to a text memo with a simple operation.

According to an embodiment, there is provided degree-of-similarity calculating means for calculating the degree of similarity of a new registration resource newly registered in a database, to each of a plurality of already-registered resources that have been already registered in the database, and candidate tag selecting means for selecting a tag attached to an already-registered resource of which the degree of similarity calculated by the degree-of-similarity calculating means is large, as a candidate for a tag to be attached to the new registration resource. Thereby, a resource management system, a method for selecting a candidate tag, and a non-transitory computer-readable medium in that a candidate tag can be also presented to a resource newly registered in a database, and a user can further readily attach a tag compared to a conventional system can be realized.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A resource management system comprising:
a processor; and
a memory device operatively coupled to the processor, the memory device storing instructions which when executed by the processor, cause the processor to:
(a) calculate a first degree of similarity by comparing first text data of a first web page which is newly registered in a database to second text data of a second web page which is already-registered in the database, said second web page including a first tag;
(b) calculate a second degree of similarity by comparing the first text data of the first web page to third data of a third web page which is already-registered in the database, said third web page including a second tag;
(c) when the first degree of similarity is higher than a predetermined value:
(i) select the first tag; and
(ii) transmit, to a user terminal, the selected first tag as a first candidate for at least one tag to be attached to said first web page;
(d) when the second degree of similarity is higher than the predetermined value:
(i) select the second tag; and
(ii) transmit, to the user terminal, the selected second tag as a second candidate for the at least one tag to be attached to the first web page; and
(e) receive, from the user terminal, a registration request including an accepted candidate tag including at least one of the first tag and the second tag based on a user selection operation at the user terminal of the at least one of the first tag and the second tag to add the accepted candidate tag to the first web page, wherein accepting the candidate tag is performed without an input device entering any characters of the accepted candidate tag.

2. A method of operating a resource management system including instructions, the method comprising:
(a) causing a processor to execute the instructions to calculate a first degree of similarity by comparing first text data of a first web page which is newly registered in a database to second text data of a second we page which is already-registered in the database, said second web page including a first tag; and
(b) causing the processor to execute the instructions to calculate a second degree of similarity by comparing the first text data of the first web page to third data of a third web page which is already-registered in the database, said third web page including a second tag;

(c) when the first degree of similarity is higher than a predetermined value, causing the processor to execute the instructions to:
  (i) select the first tag; and
  (ii) transmit, to a user terminal, the selected first tag as a first candidate for at least one tag to be attached to said first web page;
(d) when the second degree of similarity is higher than the predetermined value, causing the processor to execute the instructions to:
  (i) select the second tag; and
  (ii) transmit, to the user terminal, the selected second tag as a second candidate for the at least one tag to be attached to the first web page; and
(e) causing the processor to execute the instructions to receive, from the user terminal, a registration request including an accepted candidate tag including at least one of the first tag and the second tag based on a user selection operation at the user terminal of the at least one of the first tag and the second tag to add the accepted candidate tag to the first web page, wherein accepting the candidate tag is performed without an input device entering any characters of the accepted candidate tag.

3. A non-transitory computer-readable medium storing instructions structured to cause an information processing unit to:
(a) calculate a first degree of similarity by comparing first text data of a first web page which is newly registered in a database to second text data of a second web page which is already-registered the database, said second web page including a first tag;
(b) calculate a second degree of similarity by comparing the first text data of the first web page to third data of a third web page which is already-registered in the database, said third web page including a second tag;
(c) when the first degree of similarity is higher than a predetermined value:
  (i) select the first tag; and
  (ii) transmit, to a user terminal, the selected first tag as a first candidate for at least one tag to be attached to said first web page;
(d) when the second degree of similarity is higher than the predetermined value:
  (i) select the second tag; and
  (ii) transmit, to the user terminal, the selected second tag as a second candidate for the at least one tag to be attached to the first web page; and
(e) receive, from the user terminal, a registration request including an accepted candidate tag including at least one of the first tag and the second tag based on a user selection operation at the user terminal of the at least one of the first tag and the second tag to add the accepted candidate tag to the first web page, wherein accepting the candidate tag is performed without an input device entering any characters of the accepted candidate tag.

4. The resource management system of claim 1, wherein the user selection operation causes the user terminal to copy a character string of a user selected candidate tag and display the copied character string in a tag display field on the user terminal.

5. The method of claim 2, wherein the user selection operation causes the user terminal to copy a character string of a user selected candidate tag and display the copied character string in a tag display field on the user terminal.

6. The non-transitory computer-readable medium of claim 3, wherein the user selection operation causes the user terminal to copy a character string of a user selected candidate tag and display the copied character string in a tag display field on the user terminal.

* * * * *